(12) United States Patent
Baumann

(10) Patent No.: US 8,047,338 B2
(45) Date of Patent: Nov. 1, 2011

(54) SELF-BOOSTING FRICTION BRAKE

(75) Inventor: Dietmar Baumann, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 987 days.

(21) Appl. No.: 11/857,771

(22) Filed: Sep. 19, 2007

(65) Prior Publication Data

US 2008/0073164 A1 Mar. 27, 2008

(30) Foreign Application Priority Data

Sep. 25, 2006 (DE) .................. 10 2006 045 169

(51) Int. Cl.
*F16D 55/46* (2006.01)
*F16D 55/14* (2006.01)

(52) U.S. Cl. .................. 188/72.2; 188/72.7; 188/70 B

(58) Field of Classification Search .................. 188/72.2, 188/72.7, 70 B
See application file for complete search history.

(56) References Cited

U.S. PATENT DOCUMENTS

| 7,073,636 B2 * | 7/2006 | Baumann et al. | 188/72.2 |
| 2005/0173206 A1 * | 8/2005 | Reuter et al. | 188/72.7 |
| 2006/0131115 A1 * | 6/2006 | Han | 188/72.2 |
| 2008/0283347 A1 * | 11/2008 | Cao et al. | 188/161 |

* cited by examiner

*Primary Examiner* — Robert Siconolfi
*Assistant Examiner* — Vu Q Nguyen
(74) *Attorney, Agent, or Firm* — Ronald E. Greigg

(57) ABSTRACT

The invention relates to a self-boosting disk brake. In case of failure, in order to enable releasing the disk brake or putting it out of operation, the invention proposes embodying a self-boosting device so that it is movable in the direction of rotation of a brake disk and is fixable with a releasable fixation device.

20 Claims, 1 Drawing Sheet

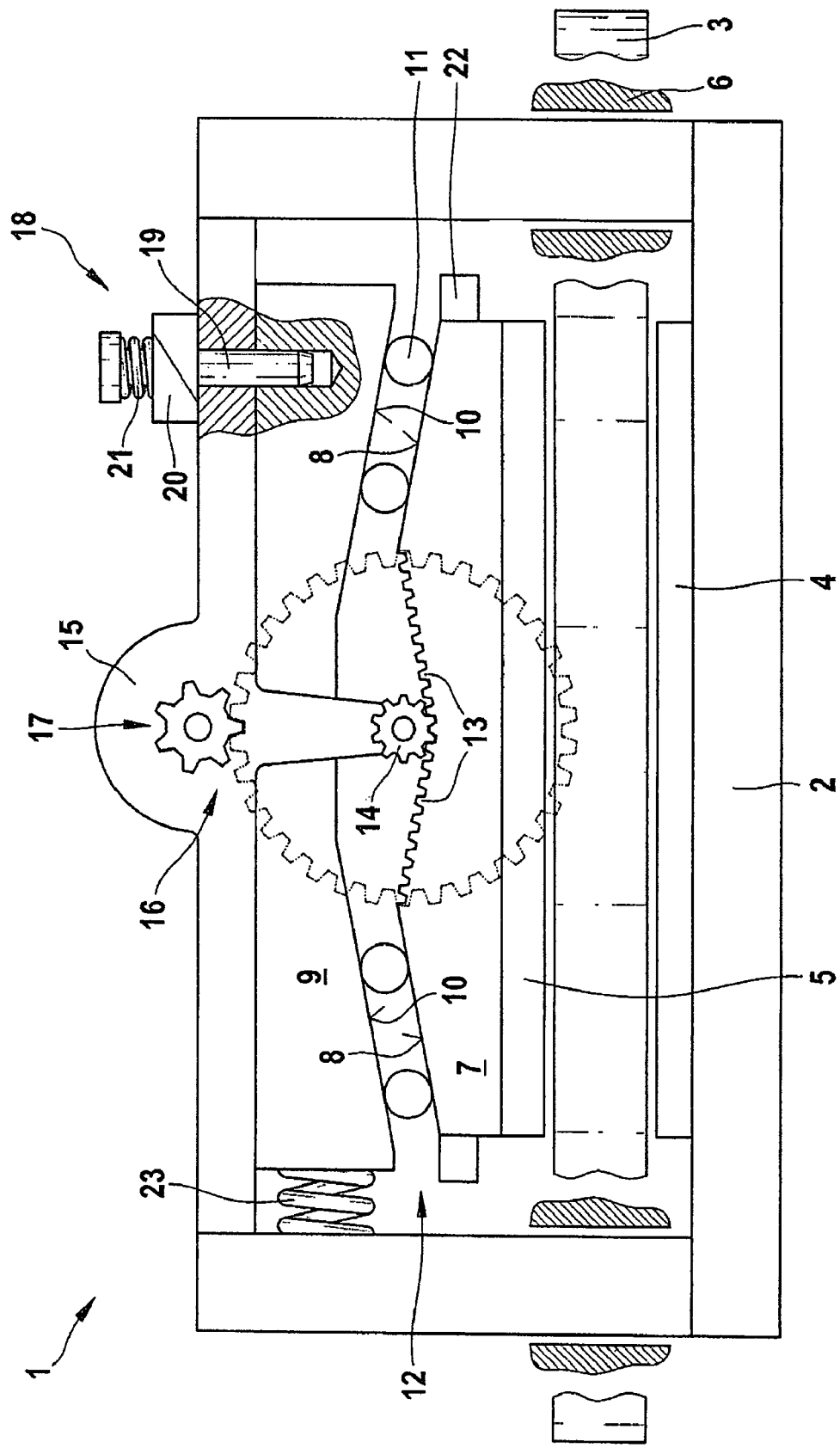

SELF-BOOSTING FRICTION BRAKE

REFERENCE TO FOREIGN PATENT APPLICATION

This application is based on German Patent Application No. 10 2006 045 169.4 filed 25 Sep. 2006, upon which priority is claimed.

BACKGROUND OF THE INVENTION

1. Field of the Invention

The invention relates to an improved self-boosting vehicle brake.

2. Description of the Prior Art

One vehicle brake in the form of a disk brake known, from German Published Patent Disclosure DE 102 01 555 A1, has a brake disk which is braked by means of a friction brake lining and an actuating device with which the friction brake lining can be pressed against the brake disk that forms the brake body. The known vehicle brake furthermore has a self-boosting device, which when the brake is actuated converts a frictional force, exerted by the rotating brake body onto the friction brake lining pressed against it, into a contact pressure, which, in addition to a contact pressure exerted by the actuating device, presses the friction brake lining against the brake body and as a result boosts the braking force of the vehicle brake.

The self-boosting device of the known vehicle brake has a wedge mechanism, which guides the friction brake lining displaceably at an angle and in the circumferential direction to the brake disk. The bracing of the friction brake lining on a wedge face, extending at an angle to the brake disk, brings about the additional contact pressure on the principle of a wedge and thus brings about the braking force boosting. To attain self-boosting for both directions of rotation of the brake disk, the vehicle brake can have two wedge faces, extending oppositely to one another or in pairs obliquely to the brake disk, whose slope need not necessarily be the same. The wedge angle may also vary over the length of the wedge face, particularly in order at the onset of the actuation to attain a long positioning distance and a high positioning speed of the friction brake lining and at the end of the displacement of the friction brake lining, at a high braking force, to attain high self-boosting. In that case, the term ramp mechanism is used.

The self-boosting device is intended in particular for a disk brake, but in principle it can be used for other forms of brakes as well, such as a drum brake. In that case, the brake body is a brake drum.

With the wedge mechanism, the known vehicle brake has a mechanical self-boosting device; other mechanical self-boosting devices are possible and are known, such as support lever constructions that brace the friction brake lining at a support angle to the brake disk. The support angle corresponds to the wedge angle; it is a mechanical analogue. Still other self-boosting devices, for instance hydraulic ones, are known and are possible.

When high self-boosting actions are sought, the problem of self-locking arises; the vehicle brake can lock. To protect against locking, the actuating device of the known vehicle brake is embodied as self-locking against an independent motion of the friction brake lining; the friction brake lining can be moved only with the actuating device. As a result, the braking force of the actuated vehicle brake does not increase independently from the self-boosting; instead, the braking force can be changed only with the actuating device.

Another known disk brake, also mechanically self-boosting by means of a wedge mechanism, is known from German Patent DE 101 56 348 C1. In this disk brake, two contrarily acting actuating devices are provided, which keep the friction brake lining free of play and prevent a displacement of the friction brake lining and hence any change in the braking force from the friction between the rotating brake disk and the brake body pressed against it when the disk brake has been actuated.

OBJECT AND SUMMARY OF THE INVENTION

In the vehicle brake of the invention, the self-boosting device is movable in the direction of rotation of the brake body and can be fixed against moving jointly with the brake body by a fixation device that can be disengaged. If the fixation device is disengaged and the self-boosting device is movable in the direction of rotation of the brake body, then upon actuation of the vehicle brake, it does not build up any contact pressure and braking force. The vehicle brake of the invention is actuatable only with the fixation device engaged, or in other words with the self-boosting device fixed. If the fixation device is disengaged with the vehicle brake actuated, the self-boosting device moves in the direction of rotation of the brake body, and as a result the vehicle brake is put out of operation and the braking force is rescinded.

The vehicle brake of the invention can as a result be released or put out of operation in every case, including in case of failure. An example of such a failure is if the vehicle brake cannot be released with its actuating device. By disengagement of the fixation device of the vehicle brake of the invention, a vehicle equipped with this vehicle brake can still be moved. A further advantage of the invention is that the vehicle brake can be designed in the self-locking range. At an average coefficient of friction between the friction brake lining and the brake body, this means that the self-boosting is so great that the actuation force is zero. At a higher coefficient of friction, self-locking of the vehicle brake would ensue, unless the actuating device were to prevent an increase in the braking force. In the self-locking range, for releasing the vehicle brake and reducing the braking force, a force oriented counter to the self-boosting action must be exerted by the actuating device. In other words, an actuating force is necessary for release instead of for actuation of the vehicle brake. If the vehicle brake is actuated in the self-locking range, then in case of failure it can be released by disengagement of the fixation device or in any case put out of operation; as a result, locking of a braked vehicle wheel can be averted. The invention thereby makes it possible to design the vehicle brake in the self-locking range, at an average coefficient of friction or even in the entire range of the coefficient of friction. This has the advantage of a low actuation force and actuating energy, which in turn makes a less-powerful and hence lighter-weight and smaller actuating device possible.

The self-boosting device need not be movable exactly in the direction of rotation of the brake body; it suffices if one component of the direction of motion is in the direction of rotation of the brake body. The self-boosting device may for instance be movable in a chord direction to the brake body. It is essential that as a result of the motion of the self-boosting device, the bracing of the friction brake lining is lost and the braking force is rescinded. It may suffice that part or parts of the self-boosting device are movable, which is what movability of the self-boosting device is to be understood to mean.

What is definitive is that the actuated vehicle brake releases independently as a result of the motion of the self-boosting device.

BRIEF DESCRIPTION OF THE DRAWING

The invention will be better understood and further objects and advantages thereof will become more apparent from the ensuing detailed description of a preferred embodiment, taken in conjunction with the single drawing FIGURE which is a schematic, simplified illustration for the sake of comprehension and explanation of the invention.

DESCRIPTION OF THE PREFERRED EMBODIMENT

The vehicle brake of the invention shown in the drawing is embodied as a disk brake 1. It has a brake caliper 2, in which on both sides of a brake disk 3 there are respective friction brake linings 4, 5. One of the two friction brake linings 4 is disposed fixedly in the brake caliper 2 and will hereinafter also be called the fixed friction brake lining 4. The other friction brake lining 5 is movable in the brake caliper 2 and will hereinafter also be called the movable friction brake lining 5. The brake caliper 2 is a so-called floating caliper; it is guided displaceably with guides 6 transversely to the brake disk 3. For actuating the disk brake 1, the movable friction brake lining 5 is pressed against the brake disk 3 in a manner to be described hereinafter. In the process, the brake caliper 2 embodied as a floating caliper moves transversely to the brake disk 3 and presses the fixed friction brake lining 4 against the other side of the brake disk 3, which is braked as a result.

On a back side, facing away from the brake disk 3, the movable friction brake lining 5 has a wedge body 7, with wedge faces 8 extending oppositely to one another, obliquely at an angle to the brake disk 3. Via the wedge faces 8, the movable friction brake lining 5 is braced on an abutment 9 in the brake caliper 2. The abutment 9 has oblique faces 10, which extend parallel to the wedge faces 8 and along which the movable friction brake lining 5 is guided displaceably. With roller bodies 11, which are located between the wedge faces 8 and the oblique faces 10, the wedge body 7 and with it the movable friction brake lining 5 are roller-supported.

The wedge faces 8 and the oblique faces 10, as already noted, extend at an angle to the brake disk 3 and in its circumferential direction. The movable friction brake lining 5 is thus guided along a helical path; an imaginary axis of the helical line coincides with an axis of rotation of the brake disk 3. The displacement of the movable friction brake lining 5 is a fraction of one full revolution inside the brake caliper 2.

For actuating the disk brake 1, the movable friction brake lining 5 is displaced along the aforementioned helical path along the oblique faces 10 of the abutment 9; it moves at a wedge angle toward the brake disk 3, is pressed against the brake disk 3, and brakes it. The movable friction brake lining 5 is always displaced in the direction of rotation of the brake disk 3 along one of the two oblique faces 10. With a reversed direction of rotation of the brake disk 3, the displacement takes place along the other oblique face 10.

When the disk brake 1 has been actuated, the rotating brake disk 3 exerts a frictional force in its direction of rotation upon the movable friction brake lining 5 that is pressed against it. The frictional force urges the movable friction brake lining 5 in the direction of an increasingly narrower wedge gap between the brake disk 3 and the oblique face 10 along which the friction brake lining 5 has been displaced. The bracing of the movable friction brake lining 5 on the oblique face 10 exerts a normal force to the oblique face 10 on the wedge body 7 of the friction brake lining 5. This normal force has one force component perpendicular to the brake disk 3, and this component, in addition to a contact pressure exerted by an actuating device to be described hereinafter, presses the movable friction brake lining 5 against the brake disk 3 and increases both the contact pressure and a braking force of the disk brake 1. The wedge body 7 and the abutment 9 form a self-boosting device 12 of the disk brake 1, and in the manner described, this device converts a frictional force, exerted by the rotating brake disk 3, upon actuation of the disk brake 1, on the movable friction brake lining 5 pressed against it, into a contact pressure, which, in addition to a contact pressure exerted by the actuating device, presses the movable friction brake lining 5 against the brake disk 3 and increases the braking force of the disk brake 1.

The wedge angle of the two wedge faces 8 may be the same or different. As a result, the self-boosting in both directions of rotation of the brake disk 3 is of either the same or different magnitudes; by means of different wedge angles, different self-boosting actions can be attained for forward travel and traveling in reverse. The wedge faces 8 can also vary their angle to the brake disk 3 over their course; for instance, the wedge angles at the onset of the displacement of the friction brake lining 5 may be large, in order to attain rapid positioning at the onset of a brake actuation. With increasing displacement of the friction brake lining 5, the wedge angle becomes more-acute, so that with increasing contact pressure and braking force, the self-boosting increases. In that case, the preferred term is a ramp mechanism; the wedge mechanism is a limit case of a ramp mechanism that has constant wedge angles over the length of the wedge face 8.

For displacing the moveable friction brake lining 5, its wedge body 7 has a rack 13, which extends from a middle or basic position with opposite angles in the circumferential direction to the brake disk 3. The slopes of the rack 13, but not necessarily its angles to the brake disk 3, are of the same magnitude, in both directions of rotation of the brake disk 3, as the slopes of the wedge faces 8. Driving a gear wheel 14, which meshes with the rack 13, to rotate causes the friction brake lining 5 to be displaced as described above for actuating the disk brake 1. The drive of the gear wheel 14 is effected by means of an electric motor 15 via a step-down gearing 16. The electric motor 15, the gear 16, the gear wheel 14, and the rack 13 form the aforementioned actuating device 17 of the disk brake 1.

The abutment 9 is supported in sliding fashion in the brake caliper 2; it is displaceable in the circumferential direction of the brake disk 3. A rolling support is also possible (not shown). For actuating the disk brake 1, a disengageable fixation device 18 restrains the abutment 9. The fixation device 18 has a bolt 19, which by means of an electromagnet 20 can be displaced into a hole in the abutment 9. The bolt 19 may also be conceived of as a locking bar; in the exemplary embodiment of the invention shown, the fixation device 18 is embodied as a positive-engagement locking device. Other positive- or non-positive-engagement fixation devices are possible within the scope of the invention for fixing the abutment 9 in the brake caliper 2 for actuation of the disk brake 1. The bolt 19 is put into engagement with the abutment 9 by supplying current to the electromagnet 20, counter to the force of a disengagement spring 21. When the electromagnet 20 is without current, the fixation device 18 is disengaged; the bolt 19 has moved out of the hole in the abutment 9, and the abutment 9 is movable in the circumferential direction of the brake disk 3. The fixation device 18 is embodied in monostable fashion; its stable state is the disengaged state. Prior to actuation of the disk brake 1, the electromagnet 20 is supplied with current, and the fixation device 18 is engaged. Supplying current to the electromagnet 20 may be done for instance when the ignition of a motor vehicle is turned on. In the drawing, the fixation device 18 is shown engaged by current having been supplied to the electromagnet 20; the bolt 19 engages the abutment 9.

In case of failure, if the disk brake 1 cannot be released with its actuating device 17, the supply of current to the electromagnet 20 is switched off and the fixation device 18 is thus disengaged, so that the abutment 9 is movable in the circumferential direction of the brake disk 3. As a result, the bracing of the movable friction brake lining 5 via its wedge body 7 and the abutment 9, in the brake caliper 2 is absent. As a result, the disk brake 1 is released or put out of operation. In case of failure, the disk brake 1 can always be released by disengagement of the fixation device 18, even in the event of self-locking or in other words locking of the brake disk 3.

As a result, the disk brake 1 can be designed with self-boosting in the range of the self-locking. "Self-locking" means that the self-boosting is so great that with the disk brake 1 actuated, the braking force, because of the frictional force exerted by the brake disk 3 on the movable friction brake lining 5, would increase to the point of locking of the brake disk 3, unless the friction brake lining 5 is restrained by the actuating device 17 from moving in the actuation direction, which is also the direction of rotation of the brake disk 3. The disk brake 1 is for instance designed with self-boosting such that at an average coefficient of friction μ between the brake disk 3 and the movable friction brake lining 5, the limit between freedom from self-locking and self-locking is reached. The coefficient of friction μ is not constant but instead varies with operating conditions such as temperature, wet weather, and soiling. If the coefficient of friction μ is greater, the disk brake 1 is operated in the range of self-locking; if it is less, the disk brake 1 is operated in the range of freedom from self-locking. Locking of the brake disk 3 can be reliably avoided in every case, as noted, by disengagement of the fixation device 18.

The wedge body 7 of the movable friction brake lining 5 has stops 22, which limit its displaceability in the circumferential direction of the brake disk 3 in the brake caliper 2.

A restoring spring 23, which in the circumferential direction of the brake disk 3 engages the brake caliper 2 and the abutment 9, restores the abutment 9 to its outset position when the fixation device 18 is disengaged; in this position, the hole in the abutment 9 is aligned with the bolt 19 of the fixation device 18, so that the fixation device 18 can be engaged by supplying current to the electromagnet 20.

Friction from the abutment 9 in the brake caliper 2 is less than friction between the movable friction brake lining 5 and the brake disk 3. It is thus assured that the actuated disk brake 1, even in the range of self-locking, will release when the fixation device 18 is disengaged. The limit condition is that the abutment 9 be displaceable with a lesser force, in the circumferential direction to the brake disk 3, than the frictional force and braking force between the brake disk 3 and the movable friction brake lining 5 at the boundary between freedom from self-locking and self-locking of the disk brake 1.

The foregoing relates to a preferred exemplary embodiment of the invention, it being understood that other variants and embodiments thereof are possible within the spirit and scope of the invention, the latter being defined by the appended claims.

I claim:

1. A self-boosting vehicle brake comprising a rotatable brake body that can be braked, a friction brake lining, an actuating device with which the friction brake lining can be pressed against the rotatable brake body for actuating the vehicle brake, a self-boosting device which converts a frictional force, exerted when the vehicle brake is actuated by the rotatable brake body, on the friction brake lining that is pressed against the brake body, into a contact pressure that, in addition to a contact pressure exerted by the actuating device, presses the friction brake lining against the brake body and thereby boosts a braking force of the vehicle brake, a support means supporting the self-boosting device for movement in a direction of rotation of the brake body, and a disengageable fixation device operable for fixing the self-boosting device against moving jointly with the brake body, wherein the self-boosting device includes an abutment against which the friction brake lining is braced, the abutment being slidably supported by the support means so as to be displaceable in a circumferential direction of the brake body, and the disengageable fixation device being able to fix the abutment from movement in the circumferential direction; wherein the disengageable fixation device is actuatable between an engaged state and a disengaged state.

2. The self-boosting vehicle brake as defined by claim 1, wherein the vehicle brake is a disk brake, and the brake body is a brake disk.

3. The self-boosting vehicle brake as defined by claim 2, wherein the vehicle brake comprises a releasable positive-engagement locking device as the fixation device for the self-boosting device.

4. The self-boosting vehicle brake as defined by claim 3, wherein the abutment is movable in the direction of rotation of the brake body with a lesser force than the frictional force, exerted when the vehicle brake has been actuated by the rotatable brake body, on the friction brake lining pressed against the brake body.

5. The self-boosting vehicle brake as defined by claim 3, wherein the self-boosting device comprises a restoring spring element which urges the self-boosting device into a disengaged position.

6. The self-boosting vehicle brake as defined by claim 2, wherein the fixation device is monostable; and wherein the disengaged state of the fixation device is stable.

7. The self-boosting vehicle brake as defined by claim 6, wherein the fixation device comprises electromagnetic actuation means.

8. The self-boosting vehicle brake as defined by claim 2, wherein the abutment is movable in the direction of rotation of the brake body with a lesser force than the frictional force, exerted when the vehicle brake has been actuated by the rotatable brake body, on the friction brake lining pressed against the brake body.

9. The self-boosting vehicle brake as defined by claim 1, wherein the vehicle brake comprises a releasable positive-engagement locking device as the fixation device for the self-boosting device.

10. The self-boosting vehicle brake as defined by claim 9, wherein the abutment is movable in the direction of rotation of the brake body with a lesser force than the frictional force, exerted when the vehicle brake has been actuated by the rotatable brake body, on the friction brake lining pressed against the brake body.

11. The self-boosting vehicle brake as defined by claim 1, wherein the fixation device is monostable; and wherein the disengaged state of the fixation device is stable.

12. The self-boosting vehicle brake as defined by claim 11, wherein the fixation device comprises electromagnetic actuation means.

13. The self-boosting vehicle brake as defined by claim 12, wherein the self-boosting device comprises a wedge mechanism or a ramp mechanism.

14. The self-boosting vehicle brake as defined by claim 11, wherein the self-boosting device comprises a restoring spring element which urges the self-boosting device into a disengaged position.

15. The self-boosting vehicle brake as defined by claim 1, wherein the fixation device comprises electromagnetic actuation means.

16. The self-boosting vehicle brake as defined by claim 15, wherein the self-boosting device comprises a restoring spring element which urges the self-boosting device into a disengaged position.

17. The self-boosting vehicle brake as defined by claim 1, wherein the abutment is movable in the direction of rotation of the brake body with a lesser force than the frictional force, exerted when the vehicle brake has been actuated by the rotatable brake body, on the friction brake lining pressed against the brake body.

18. The self-boosting vehicle brake as defined by claim 17, wherein the self-boosting device comprises a restoring spring element which urges the self-boosting device into a disengaged position.

19. The self-boosting vehicle brake as defined by claim 1, wherein the self-boosting device comprises a restoring spring element which urges the self-boosting device into a disengaged position.

20. The self-boosting vehicle brake as defined by claim 1, wherein the vehicle brake comprises a mechanical self-boosting device.

\* \* \* \* \*